B. C. ALLEN.
HEATING APPARATUS.
APPLICATION FILED AUG. 15, 1911.
1,027,970.
Patented May 28, 1912.
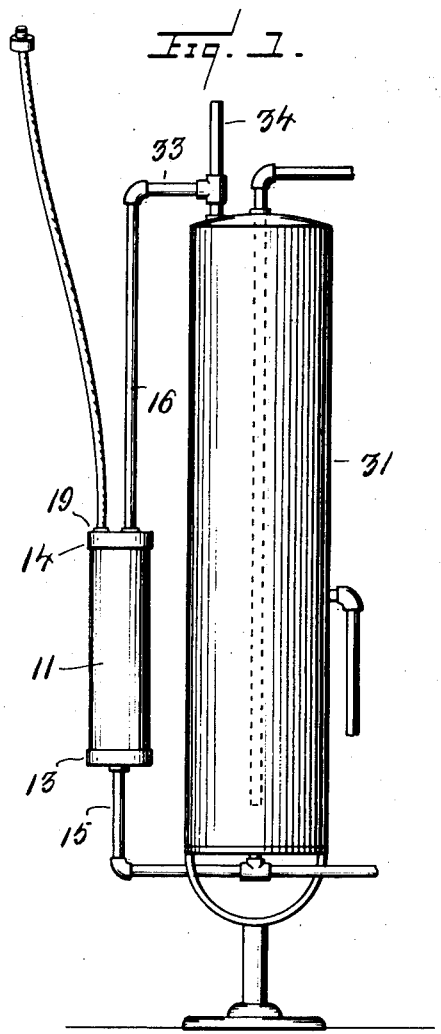
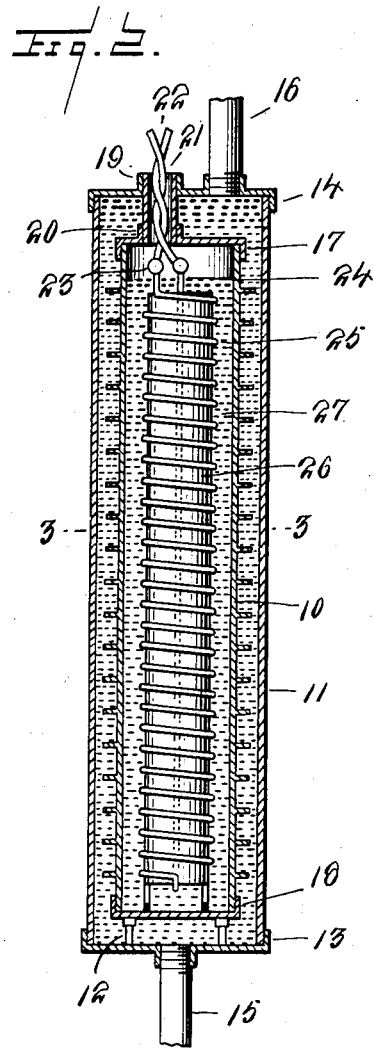
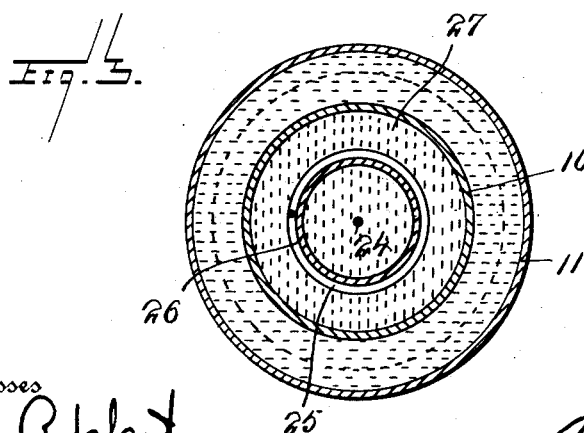
Inventor
Byron C. Allen
Witnesses
By Victor J. Evans
Attorney

UNITED STATES PATENT OFFICE.

BYRON C. ALLEN, OF CHICAGO, ILLINOIS.

HEATING APPARATUS.

1,027,970.  Specification of Letters Patent.  Patented May 28, 1912.

Application filed August 15, 1911. Serial No. 644,106.

*To all whom it may concern:*

Be it known that I, BYRON C. ALLEN, a citizen of the United States, residing at Chicago, in the county of Cook and State of Illinois, have invented new and useful Improvements in Heating Apparatus, of which the following is a specification.

An object of the invention is to provide a heating apparatus for use in heating water and the like.

My invention embodies among other features a heating apparatus, operable by electricity for heating a fluid, which in turn heats water or the like, arranged to circulate around the initial fluid that has been heated.

For the purpose mentioned, use is made of an inner casing and an outer casing, the inner casing being inclosed within the outer casing and spaced from the side walls thereof, a tube being mounted within the inner casing and containing an electrical conductor having connection with an electric current supply, an inlet and an outlet being provided to permit of circulating water between the inner casing and the outer casing with the mentioned tubular coil immersed in a fluid, which is heated when electricity is passed through the electrical conductor and which in turn, through a process of radiation causes the heat therefrom to be communicated to the water which circulates between the inner and outer casings.

Reference is to be had to the accompanying drawings constituting a part of this specification, in which similar characters of reference denote corresponding parts in all the views, and in which—

Figure 1 is a side elevation of my device showing the same used in connection with a boiler for heating water contained therein. Fig. 2 is a vertical longitudinal sectional view of my device. Fig. 3 is an enlarged horizontal sectional view taken on the line 3—3 in Fig. 2, looking in the direction of the arrow.

Referring more particularly to the views I provide an inner casing 10 and an outer casing 11, the inner casing 10 being inclosed by the casing 11 and supported therein by suitable standards 12, the mentioned inner casing being spaced from the said outer casing as shown in Fig. 2. The outer casing 10 is threadedly provided with caps 13, 14, an inlet pipe 15 being connected to the cap 13 and an outlet pipe 16 being connected to the cap 14, the standards 12 being adapted to repose upon the cap 13. The inner casing 10 is threadedly provided with caps 17, 18, the upper ends of the standards 12 being in engagement with the cap 18 to properly support the inner casing 10. The cap 14 is provided with an apertured flange 19 and the cap 17 is provided with a similar apertured flange 20, a tubular section 21 being mounted to extend through the flange 19 and the flange 20 and secured thereto with suitable electrical conductors 22 mounted to extend through the section 21.

Secured to the inner wall of the casing 10 are binding posts 23, having the ends of the electrical conductors 22 connected thereto. An end 24 of an electrical conductor 25 is secured to one of the binding posts 23 and the electrical conductor extends downwardly through a tube 26 mounted within the inner casing 10, the said conductor after passing through the tube 26 being bent rearwardly and coiled closely around the tube with the other end of the conductor connected to the other binding post 23, the ends of the tube 26 being open. The inner casing 10 is partially filled with a suitable heat conducting fluid 27, the mentioned fluid being a non-conductor of electricity, and by having the ends of the tube 26 open the mentioned fluid 27 will fill the tube 26, thus encircling the portion of the conductor 25 within the tube and the mentioned fluid will also partially inclose that portion of the conductor 25 which encircles the tube 26.

In the use of my device, the same can be conveniently connected to a boiler 31 by means of a suitable pipe 32 having connection with the inlet pipe 15, the outlet pipe 16 being connected with a pipe 33 having connection with the boiler 31 and provided with an extension 34 for connection with suitable heating devices, such as radiators or the like. Now when the conductors 22 are connected to a suitable electric current supply, such as the usual lamp socket, an electrical circuit will be established and the current will pass through the electrical conductors 22 to the binding posts 23, after which the current will pass through the electrical conductor 25, thus heating the fluid 27, within the casing 10. The fluid 27 after becoming heated, will in turn heat the casing 10 and as the water from the boiler 31 flows through the pipe 32 and the pipe 15, into the casing 11, the mentioned water will be heated by the heat from the casing 10, after which it passes upwardly out through the outlet pipe 16 and thence through the pipe 33 into the boiler 31 or through the extension 34 to the radiator.

By employing the tube 26 with the conductor 25 extending therethrough and around the periphery of the tube, a large heating surface is exposed to the fluid within the casing 10, which when heated will in turn heat the casing 10, which in turn will heat the water circulating through the casing 11, as has been heretofore mentioned.

It will be understood that I do not limit myself to the use of a particular fluid 27 within the inner casing 10, any suitable oil or the like being adaptable for this purpose and although for the purpose of describing my heating apparatus I have shown a particular construction thereof it will be understood that I do not limit myself thereto and that the scope of the invention is defined in the appended claim.

Having thus fully described the invention, what I claim as new, is:—

In a heater, the combination of a tubular casing, caps for threaded engagement with the ends of the said casing, an inlet pipe connected to one of the said caps, an outlet pipe connected to the other cap, standards mounted within the said casing on one of the said caps, a second casing mounted on the said standards and spaced from the first casing, a heat conducting fluid within the second casing and means in the second casing for heating the said fluid.

In testimony whereof I affix my signature in presence of two witnesses.

BYRON C. ALLEN.

Witnesses:
F. A. HOSTEN,
E. EDMONSTON, Jr.